US008016279B1

(12) United States Patent
Su

(10) Patent No.: US 8,016,279 B1
(45) Date of Patent: Sep. 13, 2011

(54) JAW ASSEMBLY

(76) Inventor: Yunghsien Vincent Su, Thornton, CO (US)

( * ) Notice: Subject to any disclaimer, the term of this patent is extended or adjusted under 35 U.S.C. 154(b) by 593 days.

(21) Appl. No.: 12/238,240

(22) Filed: Sep. 25, 2008

Related U.S. Application Data

(60) Provisional application No. 60/995,123, filed on Sep. 25, 2007.

(51) Int. Cl.

| | |
|---|---|
| ***B25B 1/00*** | (2006.01) |
| ***B23Q 3/02*** | (2006.01) |
| ***A44B 6/00*** | (2006.01) |
| *B25B 5/00* | (2006.01) |

(52) U.S. Cl. ................. 269/157; 269/89; 269/138; 24/1

(58) Field of Classification Search .................. 269/157, 269/16, 48.4, 50, 87.2, 89, 97, 138, 145, 269/178; 24/1

See application file for complete search history.

(56) References Cited

U.S. PATENT DOCUMENTS

| | | | | |
|---|---|---|---|---|
| 14,184 | A * | 2/1856 | Chapman | 396/438 |
| 203,701 | A * | 5/1878 | Brown | 269/88 |
| 876,908 | A * | 1/1908 | Ljunglof | 269/157 |
| 1,039,831 | A * | 10/1912 | Sisson | 269/3 |
| 2,612,735 | A * | 10/1952 | Lea | 451/389 |
| 2,827,813 | A * | 3/1958 | Totten | 269/9 |
| 4,142,714 | A * | 3/1979 | Diepeveen | 269/8 |
| 4,216,948 | A | 8/1980 | Carter | |
| 4,322,065 | A | 3/1982 | Doiron | |
| 4,375,284 | A | 3/1983 | Doiron | |
| 4,969,636 | A | 11/1990 | Gautam | |
| 5,169,079 | A | 12/1992 | Renzetti | |
| 5,809,686 | A | 9/1998 | Abby | |
| 5,941,225 | A * | 8/1999 | Tentler et al. | 124/35.2 |
| 6,126,157 | A * | 10/2000 | Rutzer | 269/71 |
| 6,564,494 | B2 | 5/2003 | Renzetti | |

OTHER PUBLICATIONS

U.S. Appl. No. 11/974,622, filed Oct. 15, 2007; Inventor: Yunghsien Vincent Su.

* cited by examiner

*Primary Examiner* — Alvin Grant

(74) *Attorney, Agent, or Firm* — Margaret Polson; Abigail Smith; Oppedahl Patent Law Firm LLC

(57) ABSTRACT

A jaw assembly to hold hooks when tying artificial lures and flies for fishing is disclosed. The jaw assembly utilizes jaw members with angled surfaces and a cam with an off-center pivot pin to open and close the jaws. A tension spring may be used to lessen the clamping force so that the angle of the hook shank can be adjusted before clamping it securely.

12 Claims, 5 Drawing Sheets

JAW ASSEMBLY

CROSS REFERENCE APPLICATIONS

This application is a non-provisional application claiming the benefits of provisional application No. 60/995,123 filed Sep. 25, 2007.

BACKGROUND

Jaw assemblies for clamping fishing hooks, particularly during fly tying, are well known. These are often used with fly tying vises, such as that disclosed in U.S. application Ser. No. 11/974,622. However, difficulties exist in clamping a fishing hook and holding the hook in place for tying artificial lures and flies for fishing. In particular, it is difficult to generate the proper amount of force such that the hook is securely clamped, but the angle of the hook in the clamp can still be adjusted. Further, current clamping devices can be expensive to manufacture.

The foregoing example of the related art and limitations related therewith are intended to be illustrative and not exclusive. Other limitations of the related art will become apparent to those of skill in the art upon a reading of the specification and a study of the drawings.

SUMMARY

An aspect of the present invention is to securely hold a hook such that the angle of the hook can be adjusted.

Another aspect of the present invention is to provide a device which is more economical to make than currently available devices.

The following embodiments and aspects thereof are described and illustrated in conjunction with systems, tool and methods which are meant to be exemplary and illustrative, not limiting in scope. In various embodiments, one or more of the above described problems have been reduced or eliminated, while other embodiments are directed to other improvements.

A jaw assembly to hold hooks when tying artificial lures and flies for fishing is disclosed. The jaw assembly utilizes jaw members with angled surfaces and a cam with an off-center pivot pin to open and close the jaws. A tension spring may be used to lessen the clamping force so that the angle of the hook shank can be adjusted before clamping it securely.

In addition to the exemplary aspects and embodiments described above, further aspects and embodiments will become apparent by reference to the accompanying drawings forming a part of this specification wherein like reference characters designate corresponding parts in the several views.

Before explaining the disclosed embodiment of the present invention in detail, it is to be understood that the invention is not limited in its application to the details of the particular arrangement shown, since the invention is capable of other embodiments. Exemplary embodiments are illustrated in referenced figures of the drawings. It is intended that the embodiments and figures disclosed herein are to be considered illustrative rather than limiting. Also, the terminology used herein is for the purpose of description and not of limitation.

DETAILED DESCRIPTION OF THE DRAWINGS

Figure 1:
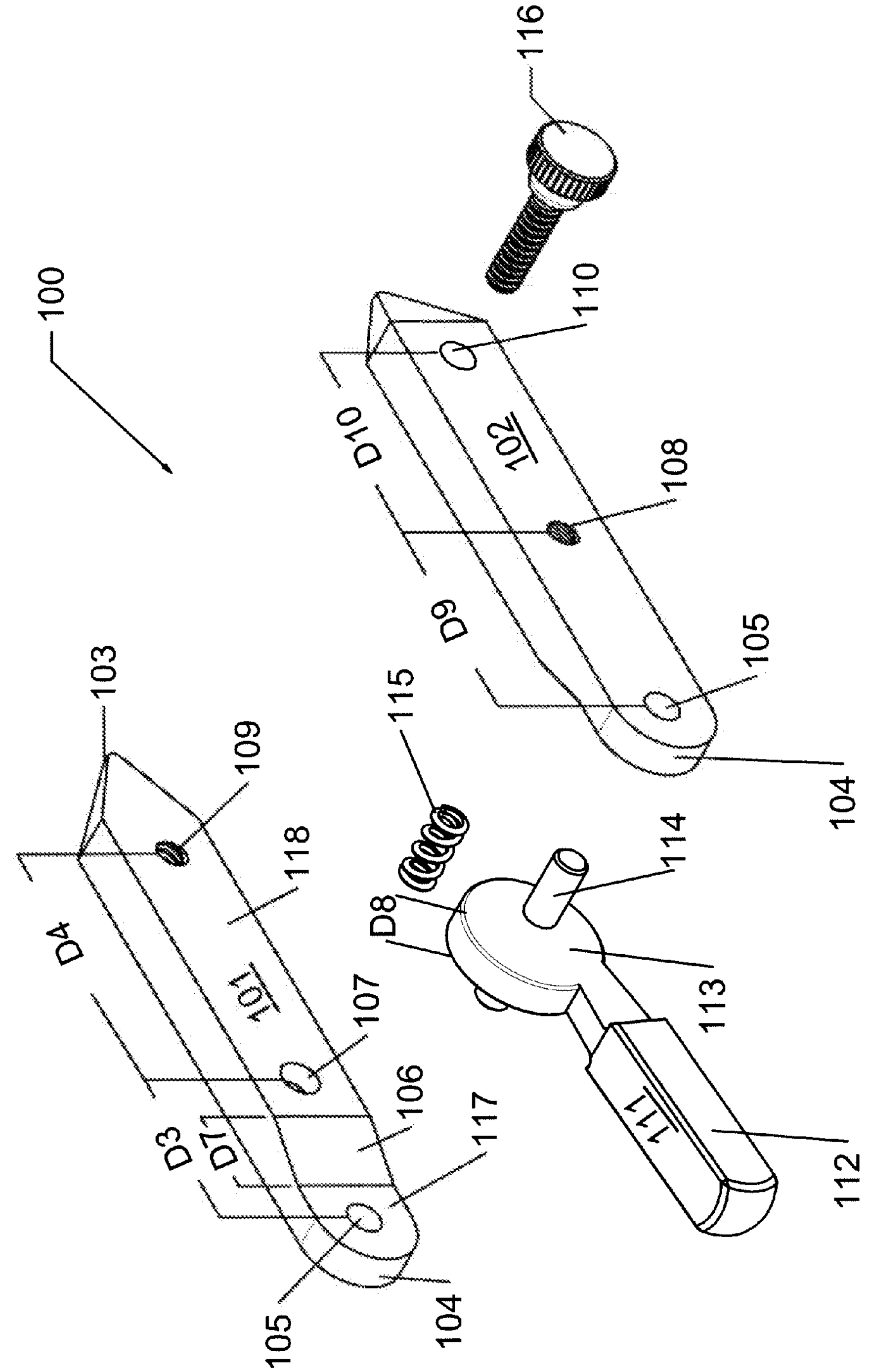
FIG. 1 is an exploded view of a jaw assembly.
Figure 2:
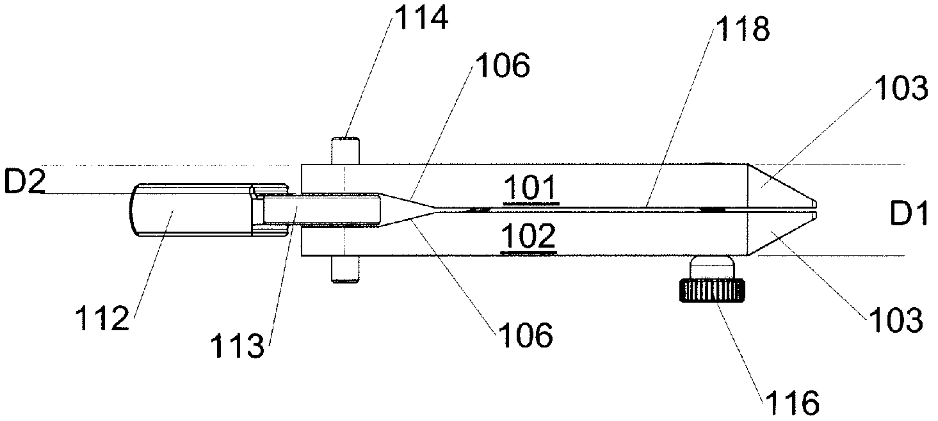
FIG. 2 is a top plan view of a jaw assembly.
Figure 4:
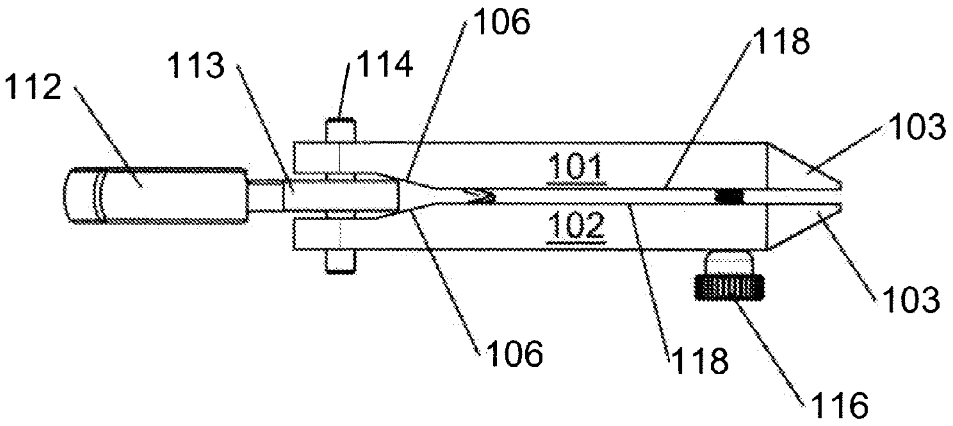
FIG. 4 is a top plan view of the jaw assembly of FIGS. 2 and 3 with cam rotated.
Figure 5:
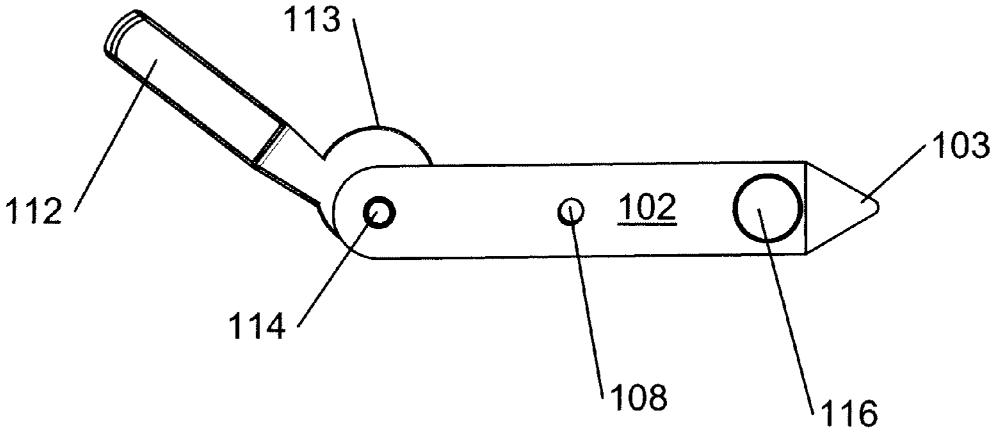
FIG. 5 is a side elevation view of the jaw member of FIG. 4.
Figure 6:
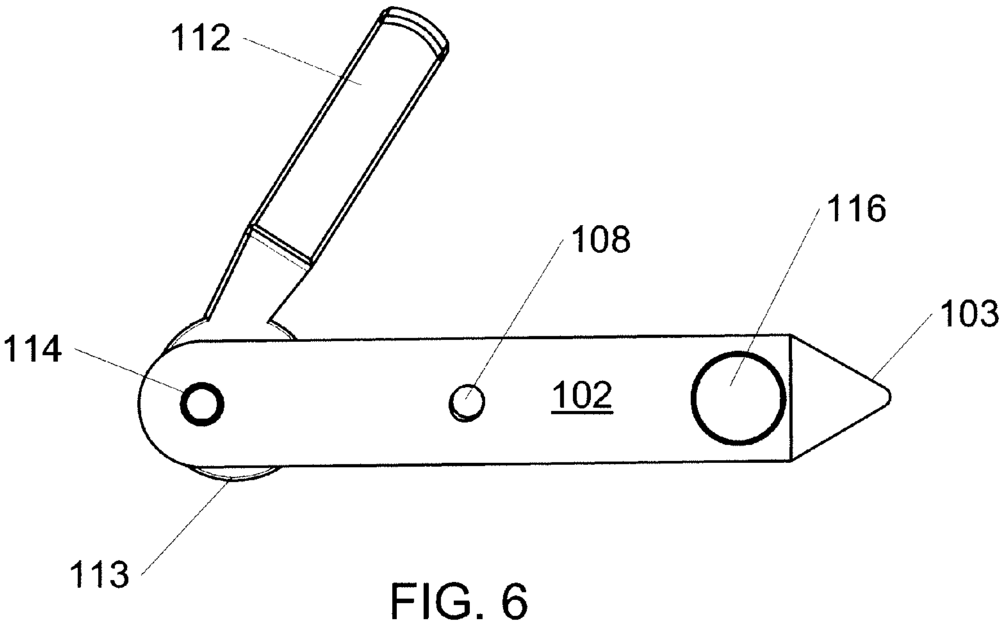
FIG. 6 is a side elevation view of the jaw member of FIG. 7.
Figure 7:
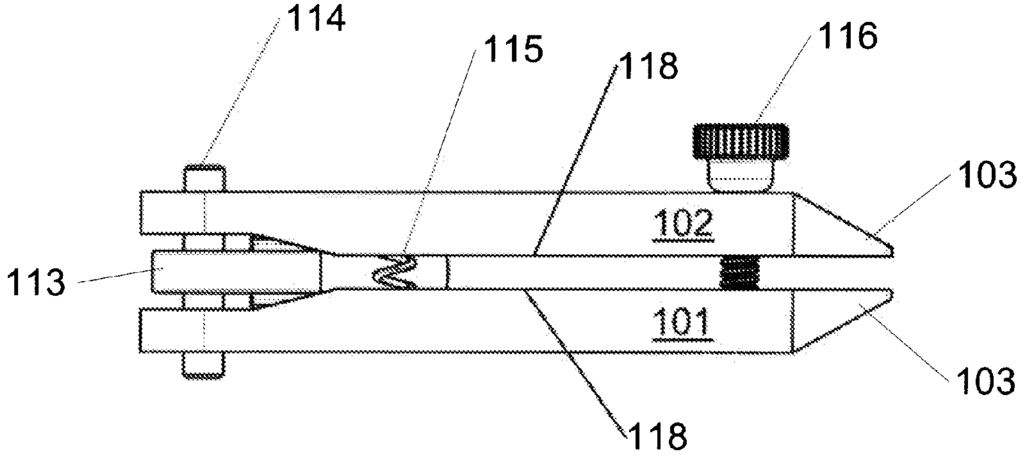
FIG. 7 is a bottom plan view of the jaw assembly of FIGS. 2 and 3 with cam rotated.

Referring first to FIG. 1, a jaw assembly 100 is shown. The jaw assembly 100 has first jaw member 101 and second jaw member 102. Jaw members 101, 102 have a length $D_5$ and a height $D_6$. Jaw members 101, 102 each have an inward tapered tip 103. The majority of the length of jaw members 101, 102 is flat along inner surface 118 such that the two jaw members 101, 102 can be substantially parallel as seen in FIG. 2. Jaw members 101, 102 have a width $D_1$ along the majority of their length. The base 104 of jaw members 101, 102 has a bore through-hole 105 in flat space 117. The width of jaw members 101, 102 at flat space 117 is $D_2$. The rear interior portion of jaw members 101, 102 has an angled surface 106 from flat space 117 to inner surface 118. Angled surface 106 has a length $D_7$. When jaw members 101, 102 are connected to form the jaw assembly 100, angled surfaces 106 form a V shape when seen from above where the base of the V points toward the inward tapered tips 103 of jaw members 101, 102 as shown in FIGS. 2, 4, and 7. When jaw members 101, 102 are connected to form jaw assembly 100, inner surfaces 118 are aligned and the distance between flat spaces 117 is at least slightly greater than $D_8$.

Jaw member 101 has a hole 107 adjacent to the angled surface 106 on inner surface 118. Distance $D_3$ separates hole 107 and bore through-hole 105. Jaw member 101 has a threaded hole 109 adjacent to tapered tip 103. Distance $D_4$ separates threaded hole 109 and hole 107.

Jaw member 102 has a threaded hole 108 adjacent to angled surface 106. Distance $D_9$ separates threaded hole 108 and bore through-hole 105. Jaw member 102 has a hole 110 adjacent to tapered tip 103. Distance $D_{10}$ separates hole 110 and threaded hole 108.

Figure 8:
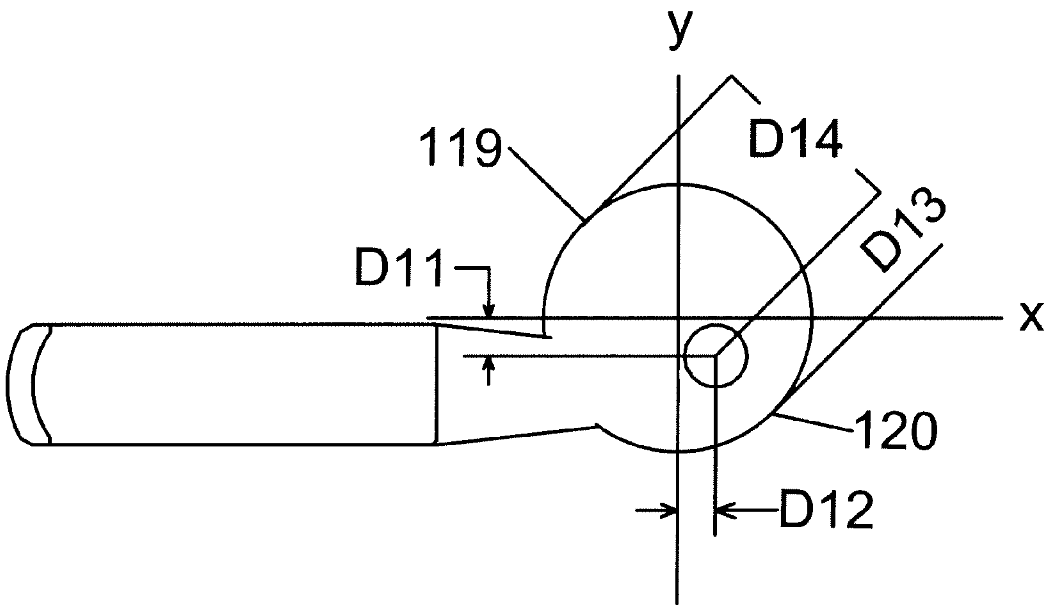
FIG. 8 is a side elevation view of the cam.

Cam 111 is comprised of a lever 112 and a disc 113. Disc 113 has a perimeter surface with a substantially uniform width of $D_8$. Lever 112 extends radially from the perimeter surface of disc 113. Pivot pin 114 transverses disc 113 and extends perpendicular thereto. Pivot pin 114 is mounted off center of both the x and y axes of disc 113 as shown in FIG. 8. The longitudinal axis of lever 112 is substantially parallel to the x axis of disc 113. Pivot pin 114 is located on the opposing side of the y axis from the lever 112 and on the same side of the x axis as lever 112. The distance the pivot pin is off set from the center of the disc 113, also the intersection of the x and y axes, is $D_{11}$ and $D_{12}$. In the depicted embodiment $D_{11}$ equals $D_{12}$, but this is not required. The pivot pin is distance $D_{13}$ from the perimeter at its closest point 120 and distance $D_{14}$ at its farthest point 119. The length L of a line from the center of pivot pin to any point on the perimeter continuously increases from 120 to 119.

Pivot pin 114 is inserted in bore through-holes 105 of jaw members 101, 102. The thickness of disc 113 and the depth of the surfaces are chosen such that disc 113 fits in the space between flat spaces 117 when the jaw members 101, 102 are together. One end of tension spring 115 is inserted in hole 107 of jaw member 101 and the other end of tension spring 115 is inserted in hole 107 (not shown) of inner surface 118 of jaw member 102. Screw 116 is inserted through hole 110 in jaw member 102 and screws into threaded hole 109 in jaw member 101 as seen in FIGS. 2, 4 and 7.

Figure 3:
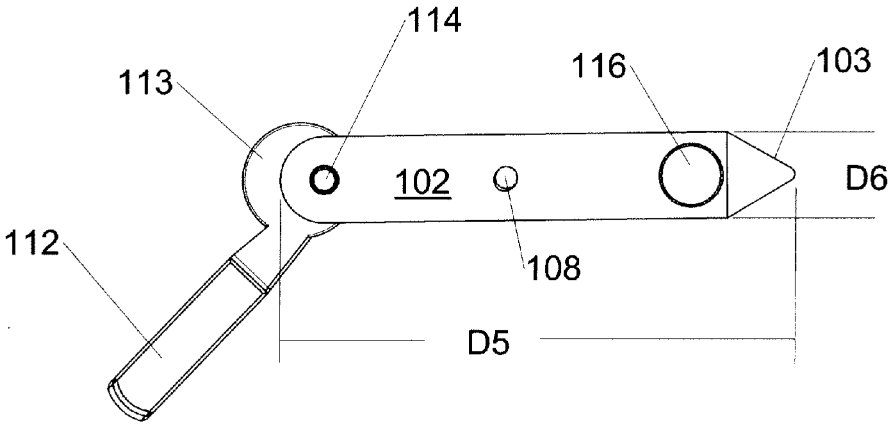
FIG. 3 is a side elevation view of the jaw member of FIG. 2.

The offset of pivot pin 114 on disc 113 and the location of lever 112 on disc 113 are such that when lever 112 is in position 1, depicted in FIGS. 2 and 3, disc 113 does not intrude into the V formed by angled surfaces 106 when jaw members 101, 102 are together. As lever 112 is moved to position 2, depicted in FIGS. 4, 5, 6 and 7, disc 113 is rotated. The offset of pivot pin 114 causes an increasing portion of disc 113 to travel into the V formed by angled surfaces 106 when jaw members 101, 102 are together, forcing jaw members 101, 102 apart at base 104. Since jaw members 101, 102 are pinned together, forcing bases 104 apart causes a clamping force on ends 103.

Referring next to FIGS. 2 and 3, jaw members 101, 102 are shown with lever 112 rotated below the plane of jaw assembly 100. In this position, disc 113 of cam 112 remains near the tip of the V shape formed by the intersection of angled intercuts 106, thus keeping tapered tips 103 of jaw members 101, 102 apart.

Referring next to FIGS. 4, 5, 6 and 7, jaw members 101, 102 are shown with lever 112 rotated above the plane of jaw assembly 100. In this position, disc 113 of cam 112 moves into the V shape formed by the intersection of angled intercuts 106, thus moving tapered tips 103 of jaw members 101, 102 together. The length of the V shape is determined by the distance $D_7$. The distance $D_{14}$ from the pivot pin 114 to the farthest point on the perimeter of the disc 119 is equal to or less than the distance $D_7$, otherwise the disc 113 will push past the shape of V shape, which would cause a sudden change in the clamping force, as opposed to the smooth increase desired.

Screw 116 can then be used to further adjust the distance between tapered tips 103 of jaw members 101, 102. Tension spring 115 keeps tapered tips of jaw members 101, 102 closed with a minimum of clamping force. Less clamping force allows jaw assembly 100 to hold a fishing hook loosely so that the angle of the hook shank can be adjusted before it is clamped securely between tapered tips 103 of jaw members 101, 102.

The nominal dimensions for the depicted embodiment are: $D_5$ is approximately 5.6 cm, $D_6$ is approximately 0.9 cm, $D_1$ is approximately 0.41 cm, $D_2$ is approximately 0.3 cm, $D_7$ is approximately 0.71 cm, $D_8$ is approximately 0.3 cm, $D_3$ is approximately 1.5 cm, $D_4$ is approximately 2.6 cm, $D_9$ is approximately 2.05 cm and $D_{10}$ is approximately 2.05 cm. $D_{11}$ and $D_{12}$ are approximately 0.18 cm. $D_{13}$ is approximately 0.38 cm and $D_{14}$ is approximately 0.89 cm. It should be understood that different ratios and dimensions than those disclosed could be used other than where the specification specifically states otherwise.

While a number of exemplary aspects and embodiments have been discussed above, those of skill in the art will recognize certain modifications, permutations, additions and sub-combinations therefore. It is therefore intended that the following appended claims hereinafter introduced are interpreted to include all such modifications, permutations, additions and sub-combinations are within their true sprit and scope. Each apparatus embodiment described herein has numerous equivalents.

I claim:

1. A jaw assembly comprising:

two jaw members;

said jaw members having a length $D_5$, a height $D_6$ and a width $D_1$ along the majority of the length of said jaw member;

each of said jaw members having a base end with a flat space on facing surfaces of the jaw members, said flat surface having a width of $D_2$, $D_2$ being less than $D_1$, an angled surface extending from $D_1$ to $D_2$, said angled surface having a length $D_7$ such that a first open space is formed between the flat surfaces and a second generally V shaped open space is formed between the angled surfaces when the facing surfaces are aligned;

a cam; said cam comprising a disc having an x and a y axis that intersect at a center point of the disc, said axes being horizontal and vertical respectively, two side surfaces, and a perimeter surface with a width $D_8$, a lever extending radially from the perimeter surface of the disc such that the longitudinal axis of the lever is substantially parallel to the x axis, and a pivot pin transversing the disc and extending substantially perpendicular to the side surfaces of the disc;

said pivot pin being located off set from both the x and y axes, and located on the opposing side of the y axis from the lever and on the same side of the x axis as the lever;

said cam pivotally mounted via the pivot pin between the jaw members at the flat surface in said first open space; and wherein the off set of the pivot pin is configured such that a progressively increasing portion of the disc is rotated into the V shaped open space as the lever is moved from a first position to a second position.

2. The jaw assembly of claim 1 wherein a tips of said jaw members are tapered.

3. The jaw assembly of claim 1 wherein a tension spring is mounted between said facing surfaces of said jaw members.

4. The jaw assembly of claim 3 wherein said tension spring is adjacent to said angled surface in said jaw members.

5. The jaw assembly of claim 1 wherein a screw connects said jaw members.

6. The jaw assembly of claim 4 wherein said screw is adjacent to the tip of said jaw members.

7. A jaw assembly comprising:

two jaw members;

said jaw members having a length $D_5$, a height $D_6$ and a width $D_1$ along majority of the length of said jaw member;

each of said jaw members having a base end with a flat space on facing surfaces of the jaw members, said flat surface having a width of $D_2$, $D_2$ being less than $D_1$, an angled surface extending from $D_1$ to $D_2$, said angled surface having a length $D_7$ such that a first open space is formed between the flat surfaces and a second generally V shaped open space is formed between the angled surfaces when the facing surfaces are aligned;

a cam; said cam comprising a disc having an x and a y axis that intersect at a center point of the disc, said axes being horizontal and vertical respectively, two side surfaces, and a perimeter surface with a width $D_8$, a lever extending radially from the perimeter surface of the disc such that the longitudinal axis of the lever is substantially parallel to the x axis, and a pivot pin transversing the disc and extending substantially perpendicular to the side surfaces of the disc;

said pivot pin being located off set from both the x and y axes, and located on the opposing side of the y axis from the lever and on the same side of the x axis as the lever said cam pivotally mounted via the pivot pin between the jaw members at the flat surface in said first open space; and a plurality of lines extending from the pivot pin to the side surface, the pin mounted such that progressively increasing lines are moved between the angled surfaces as the lever is rotated from a first position to a second position.

8. The jaw assembly of claim 7 wherein a tips of said jaw members are tapered.

9. The jaw assembly of claim 7 wherein a tension spring is mounted between said facing surfaces of said jaw members.

10. The jaw assembly of claim 9 wherein said tension spring is adjacent to said angled surface in said jaw members.

11. The jaw assembly of claim 7 wherein a screw connects said jaw members.

12. The jaw assembly of claim 11 wherein said screw is adjacent to the tip of said jaw members.

* * * * *